(12) United States Patent
Sanchez, Sr.

(10) Patent No.: US 7,814,701 B1
(45) Date of Patent: Oct. 19, 2010

(54) FISH RETENTION APPARATUS

(76) Inventor: Refugio Sanchez, Sr., 1806 Gaylord Dr., Austin, TX (US) 78728

( * ) Notice: Subject to any disclaimer, the term of this patent is extended or adjusted under 35 U.S.C. 154(b) by 30 days.

(21) Appl. No.: 11/505,570

(22) Filed: Nov. 10, 2006

(51) Int. Cl.
A01K 97/14 (2006.01)

(52) U.S. Cl. ........................ 43/5; 43/4; 81/421

(58) Field of Classification Search ............... None
See application file for complete search history.

(56) References Cited

U.S. PATENT DOCUMENTS

| | | | | |
|---|---|---|---|---|
| 390,758 A | * | 10/1888 | Davis | 294/111 |
| 1,763,437 A | * | 6/1930 | Munkelwitz | 294/118 |
| 1,949,452 A | * | 3/1934 | Chadwick | 294/118 |
| D168,879 S | * | 2/1953 | Becker | D7/687 |
| 2,634,159 A | * | 4/1953 | Agneberg | 294/118 |
| 2,643,151 A | * | 6/1953 | Zupancic | 294/118 |
| 2,990,863 A | * | 7/1961 | Pantermoller | 30/135 |
| 3,201,888 A | * | 8/1965 | Barbee | 43/4 |
| D223,574 S | * | 5/1972 | Pittitis | D22/150 |
| 3,664,703 A | * | 5/1972 | Talley | 294/118 |
| 3,820,274 A | * | 6/1974 | Drenzyk | 43/53.5 |
| 3,921,327 A | * | 11/1975 | Casazza | 43/4 |
| 4,559,853 A | * | 12/1985 | Oye | 81/420 |
| 4,620,386 A | * | 11/1986 | Hare | 43/4 |
| 4,965,954 A | * | 10/1990 | Cavazos | 43/4 |
| 5,054,226 A | * | 10/1991 | Hart | 43/4 |
| 5,090,097 A | * | 2/1992 | Koester et al. | 24/552 |
| 5,207,014 A | * | 5/1993 | Panella | 43/4 |
| 5,475,941 A | * | 12/1995 | Moore | 43/4 |
| 5,557,874 A | * | 9/1996 | Pietrandrea et al. | 43/4 |
| 6,256,923 B1 | * | 7/2001 | Norton | 43/4 |
| 6,571,505 B1 | * | 6/2003 | Poiencot, Jr. | 43/5 |
| 6,944,986 B1 | * | 9/2005 | Gonzalez et al. | 43/4 |
| 6,983,559 B1 | * | 1/2006 | Kraus | 43/4 |

* cited by examiner

Primary Examiner—Christopher P Ellis

(57) ABSTRACT

An apparatus configured for fish retention includes a first arm and a second arm integral with a channel lock hinge having a plurality of channels; a lattice top jaw integral to the channel lock hinge, the lattice top jaw and bottom jaw defining a curved surface extending through a middle portion of the lattice top and bottom jaw from the channel lock hinge to a forward end, each of the lattice top jaw and the lattice bottom jaw movable to form an adjustable cavity for receiving a fish; the lattice top jaw defining a first notch at the lattice top jaw forward end, and the lattice bottom jaw defining a second notch at the lattice bottom jaw forward end, the first notch and the second notch configured to enable retention of the fish without damaging one or more fins of the fish.

5 Claims, 4 Drawing Sheets

FISH RETENTION APPARATUS

TECHNICAL FIELD

The present application relates generally to an apparatus for holding a fish.

SUMMARY

In one aspect, an apparatus is configured for fish retention comprising: a hand tool (100) with a first arm (102) and a second arm (104) the first and second arms integral with a channel lock hinge (106) having a plurality of channels (108): a lattice top jaw (110) integral to the channel lock hinge (106), the lattice top jaw (110) defining a curved surface (111) extending through a middle portion of the lattice top jaw (110) from the channel lock hinge (106) to a lattice top jaw forward end (112) of the lattice top jaw (110): a lattice bottom jaw (114) integral with the channel lock hinge (106), the lattice bottom jaw (114) defining a second curved surface (116) extending through a middle portion of the lattice bottom jaw (114) from the channel lock hinge (106) to a lattice bottom jaw forward end (115), each of the lattice top jaw (110) and the lattice bottom jaw (114) movable to form an adjustable cavity (116) for receiving a fish; the lattice top jaw (110) defining a first notch (118) at the lattice top jaw forward end (112), and the lattice bottom jaw (114) defining a second notch (120) at the lattice bottom jaw forward end (115), the first notch (118) and the second notch (120).

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject described herein will become apparent in the text set forth herein.

BRIEF DESCRIPTION OF THE DRAWINGS

A better understanding of the subject matter of the application can be obtained when the following detailed description of the disclosed embodiments is considered in conjunction with the following drawings, in which.

Figure 1:
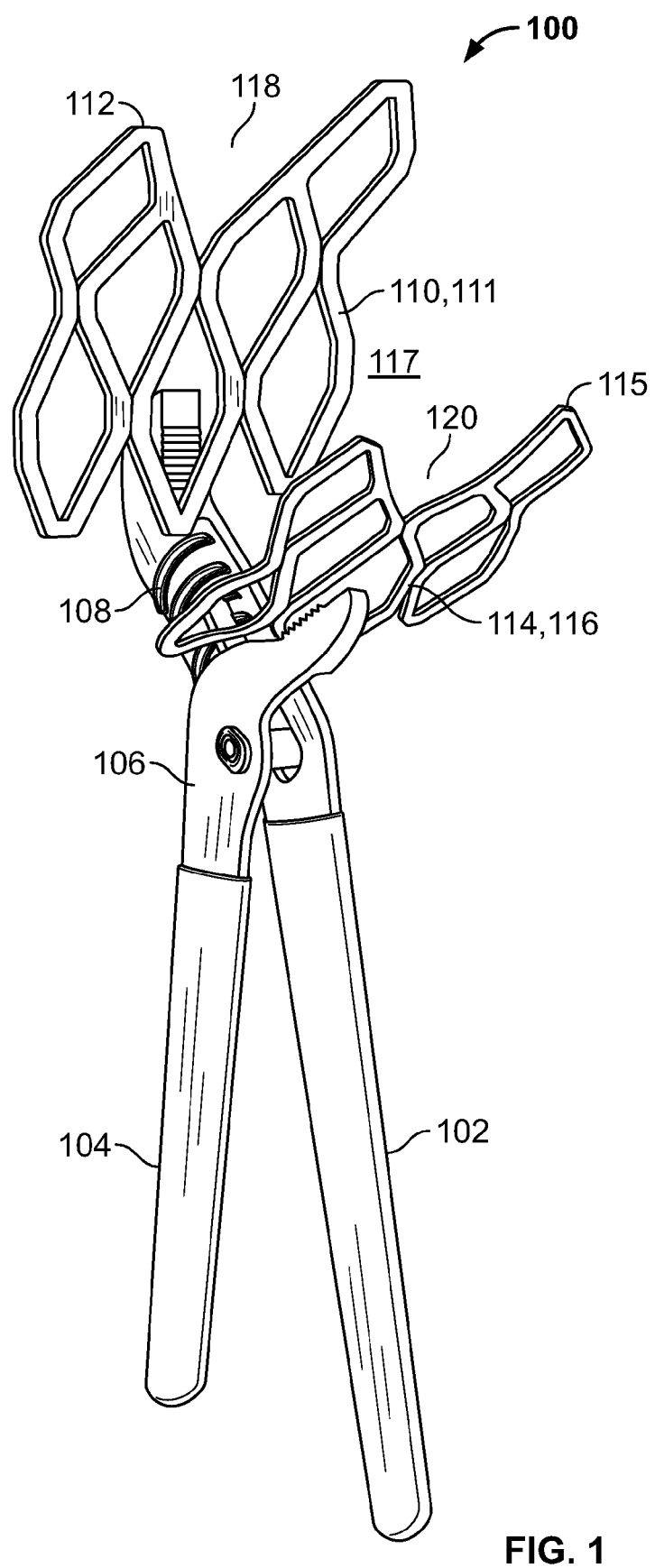
FIG. 1 is a perspective view of the fish retention apparatus in accordance with an embodiment of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE DRAWINGS

A frequent problem when catching fish relates to the need to remove a hook from a fish mouth or otherwise handle a fish to avoid hurting the fish. If a fish is caught as part of a catch and release type of fishing sport, there is a need to maintain a fish in the best condition for continued longevity. Additionally, some fish are difficult to handle without getting cut. For example, catfish and other fish with barbs and sharp bodily appendages can be difficult to handle to remove a hook or to pull from water. A fish caught by fishing pole can be handled with a net, however certain fish are prone to damage by nets, especially those that have antennae, barbs, sharp fins and the like. Accordingly, there is a need for a device that can carefully retain and hold a fish without requiring the use of a net or other fish-damaging device. The fish retention apparatus described herein provides a safe hand tool for enabling one-handed retention of a fish to enable a user to remove a hook or otherwise place the fish.

Referring now to the figures. FIGS. 1-4 illustrate a fish retention apparatus configured as a hand tool 100. The hand tool includes a first arm (102) and a second arm (104), the first and second arms integral with a channel lock hinge (106) having a plurality of channels (108). The plurality of channels (108) is configured to enable retention of a plurality of different sized fish.

FIG. 1 illustrates a lattice top jaw (110) integral to the channel lock hinge (106), the lattice top jaw (110) defining a curved surface (111) extending through a middle portion of the lattice top jaw (110) from the channel lock hinge (106) to a lattice top jaw forward end (112) of the lattice top jaw (110). The lattice top jaw (110) and the lattice bottom jaw (114) can be made of metal with a rust inhibiting coating applied thereon.

FIG. 1 further illustrates lattice bottom jaw (114) integral with the channel lock hinge (106), the lattice bottom jaw (114) defining a second curved surface (116) extending through a middle portion of the lattice bottom jaw (114) from the channel lock hinge (106) to a lattice bottom jaw forward end (115).

Each of the lattice top jaw (110) and the lattice bottom jaw (114) are configured to be movable to form an adjustable cavity (117) for receiving a fish. The adjustable cavity is formed by determining the appropriate size of the fish via the plurality of channels (108) of the hinge. The adjustable cavity enables retention of different sized fish to enable a fisherman to safely practice "catch and release" of fish that otherwise would be damaged in the fishing process. More specifically, certain fishes with barbs and other sharp bodily appendages can be caught in nets or be difficult to handle after being caught using a fishing pole.

Figure 4:
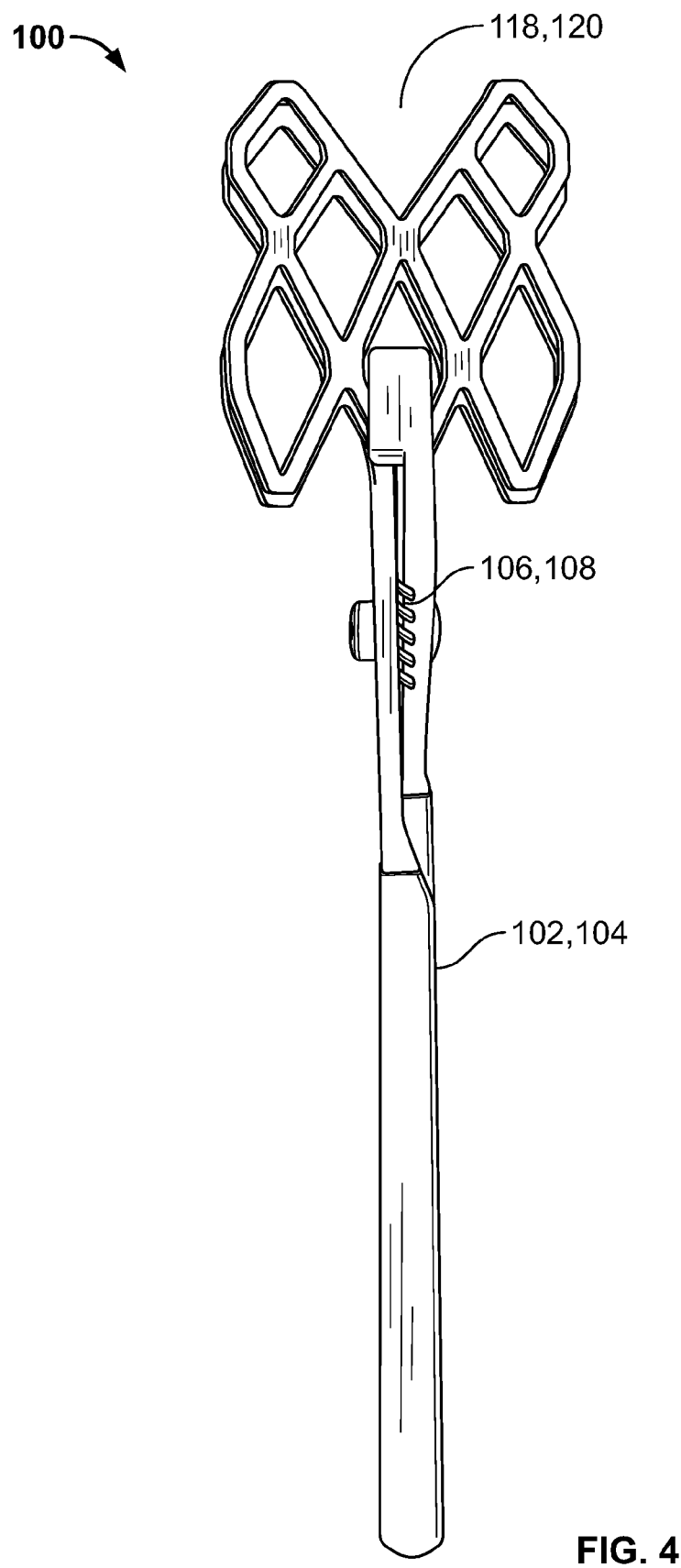
FIG. 4 is a top view of the fish retention apparatus in accordance with an embodiment of the present invention.

As shown in FIGS. 1 and 4, the lattice top jaw (110) defines a first notch (118) at the lattice top jaw forward end (112), and the lattice bottom jaw (114) defines a second notch (120) at the lattice bottom jaw forward end (115), the first notch (118) and the second notch (120) can be configured to receive fins of a fish to carefully handle a fish for removal of a hook or other purpose.

Figure 2:
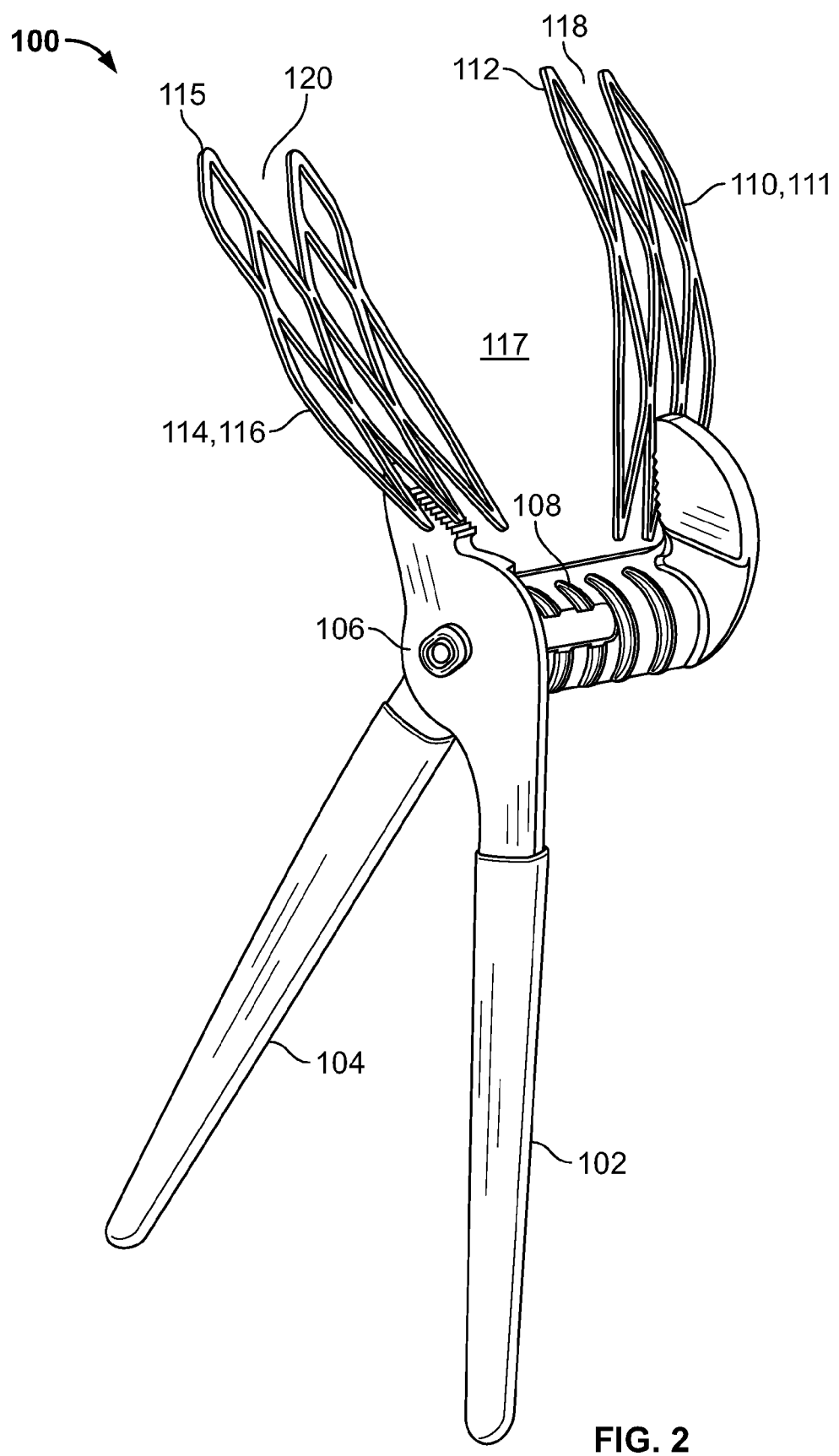
FIG. 2 is a side view of the fish retention apparatus in an open position in accordance with an embodiment of the present invention.
Figure 3:
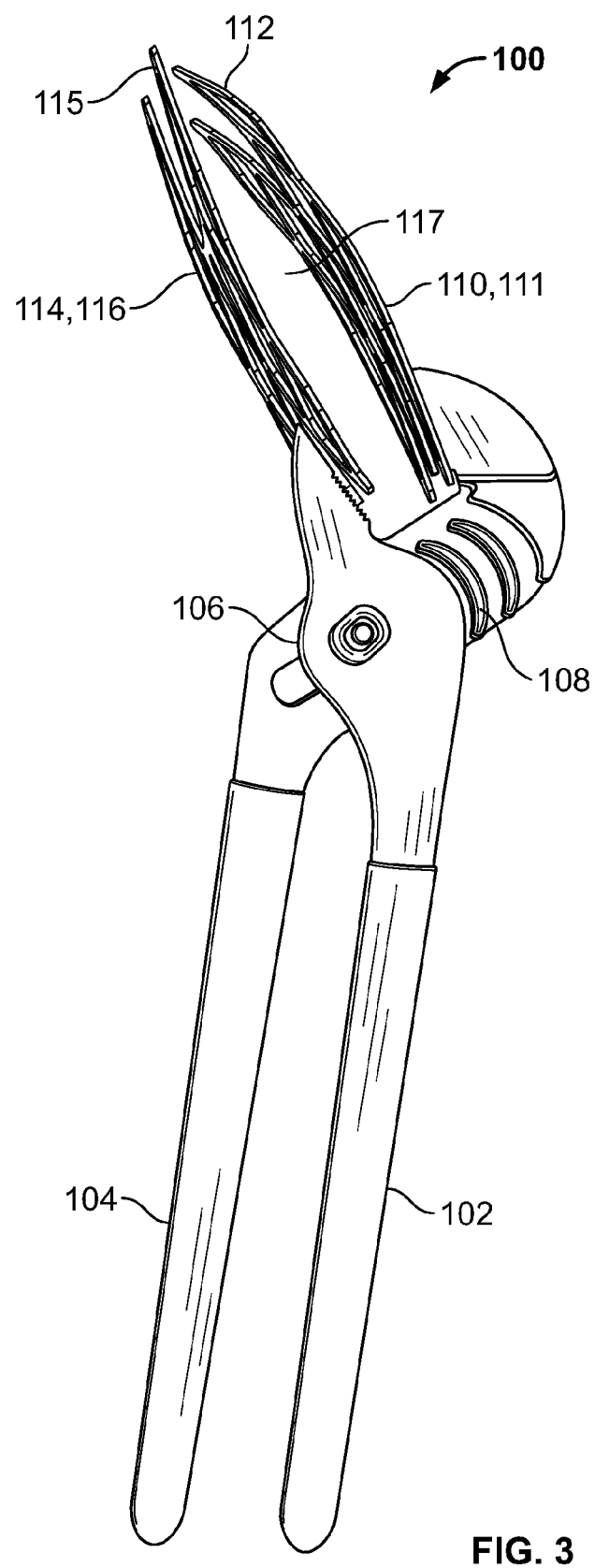
FIG. 3 is a side view of the fish retention apparatus in a closed position in accordance with an embodiment of the present invention.

Referring now to FIG. 2, the hand tool 100 is shown in an open position wherein curve 111 can be seen in perspective view. The curved surface enables a fish to be gripped safely without damaging the fish by enabling a more constant pressure to surround the fish after the squeezing the first arm 102 and second arm 104 of the hand tool. FIG. 3 illustrates a closed position of hand tool 100 to illustrate that curve 111 and 116 can be closed to surround different sized fishes by altering the size of cavity 117. As will be appreciated, the use of channel locking hinge 106 determines the size of cavity 117 to allow gripping of different sized fishes.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g. the term "including" should be interpreted as "including but not limited to." the term "having" should be interpreted as "having at least." the term "includes" should be interpreted as "includes but is not limited to." etc.). It will be further understood by those within the art that if a specific number of an introduced claim recitation is intended, such an intent will be explicitly recited in the claim, and in the absence of such recitation no such intent is present.

I claim:

1. An apparatus configured for fish retention comprising: a hand tool with a first arm and a second arm, the first and second arms integral with a channel lock hinge having a plurality of channels; a lattice top jaw integral to the channel lock hinge, the lattice top jaw defining a curved surface extending through a middle portion of the lattice top jaw from the channel lock hinge to a lattice top jaw forward end of the lattice top jaw; a lattice bottom jaw integral with the channel lock hinge, the lattice bottom jaw defining a second curved surface extending through a middle portion of the lattice bottom jaw from the channel lock hinge to the lattice bottom jaw forward end, each of the lattice top jaw and the lattice bottom jaw movable to form an adjustable cavity for receiving a fish; the lattice top jaw defining a first notch at the lattice top jaw forward end, and the lattice bottom jaw defining a second notch at the lattice bottom jaw forward end, the first notch and the second notch configured to enable retention of the fish without damaging one or more fins of the fish.

2. The apparatus of claim 1 wherein the lattice top jaw and the lattice bottom jaw are metal and with an anti-rust coating.

3. The apparatus of claim 1, wherein the lattice top jaw and the lattice bottom jaw are configured to be at least 3 inches in length and at least 2 inches in width.

4. The apparatus of claim 1, wherein the first notch and the second notch are configured to be triangular in shape with each side of the notch forming an acute angle there between.

5. The apparatus of claim 1, wherein the plurality of channels are configured to adjust the hand tool for different sized fish.

* * * * *